US006807396B2

(12) United States Patent
(10) Patent No.: US 6,807,396 B2
(45) Date of Patent: *Oct. 19, 2004

Horie et al.

(54) ANTENNA RECEIVING SYSTEM

(75) Inventors: Ryo Horie, Saitama (JP); Wasuke Yanagisawa, Tokyo (JP)

(73) Assignee: Mitsubishi Electric & Electronics USA, Inc., Cypress, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/406,920

(22) Filed: Apr. 4, 2003

(65) Prior Publication Data

US 2003/0190902 A1 Oct. 9, 2003

Related U.S. Application Data

(63) Continuation of application No. 09/167,311, filed on Oct. 6, 1998, now Pat. No. 6,556,807.

(51) Int. Cl.[7] ................................................ H04Q 7/20

(52) U.S. Cl. ...................................... 455/3.02; 455/133

(58) Field of Search ................................ 455/3.02, 133, 455/140, 134–138, 282, 192.2, 193.1, 127, 129, 78, 560, 343, 269, 188.2; 375/316, 347, 349; 343/840, 786; 342/361, 362

(56) References Cited

U.S. PATENT DOCUMENTS

| | | | | |
|---|---|---|---|---|
| 3,953,801 | A | 4/1976 | Podowski | 455/186.1 |
| 4,028,500 | A | 6/1977 | McClure et al. | 455/566 |
| 4,278,978 | A | 7/1981 | Frosch et al. | 455/276.1 |
| 4,602,218 | A | 7/1986 | Vilmur et al. | 330/279 |
| 5,203,031 | A | 4/1993 | Sugayama | 455/182.1 |
| 5,303,400 | A | 4/1994 | Mogi | 455/186.1 |
| 5,339,452 | A | 8/1994 | Sugawara | 455/212 |
| 5,345,591 | A | 9/1994 | Tsurumaki et al. | 455/3.2 |
| 5,345,601 | A | 9/1994 | Takagi et al. | 455/59 |
| 5,361,404 | A | 11/1994 | Dent | 455/135 |
| 5,390,357 | A | 2/1995 | Nobusawa et al. | 455/134 |
| 5,437,051 | A | 7/1995 | Oto | 455/318 |
| 5,483,663 | A | 1/1996 | Tawil | 455/3.2 |
| 5,649,312 | A | 7/1997 | Kennan | 455/343 |
| 5,649,318 | A | 7/1997 | Lusignan | 455/3.2 |
| 5,697,075 | A | 12/1997 | Kim | 455/133 |
| 5,757,866 | A | 5/1998 | Kannari et al. | 375/347 |
| 5,854,986 | A | 12/1998 | Dorren et al. | 455/562 |
| 5,940,737 | A | 8/1999 | Eastman | 455/13.1 |
| 5,940,750 | A | 8/1999 | Wang | 455/31 |
| 5,959,592 | A | 9/1999 | Petruzzelli | 343/840 |
| 6,097,773 | A | 8/2000 | Carter et al. | 375/347 |
| 6,122,482 | A | 9/2000 | Green, Sr. et al. | 455/12.1 |
| 6,134,430 | A | 10/2000 | Younis et al. | 455/340 |

*Primary Examiner*—Jean Gelin
(74) *Attorney, Agent, or Firm*—Orrick, Herrington & Sutcliffe LLP

(57) ABSTRACT

A receiving antenna system includes an antenna unit, a receiver unit, a down converter and a DC power/control supply. The antenna unit includes a parabolic reflector, a feed horn and an orthomode transducer, which are configured to capture, isolate, and output respective first and second polarized RF signals. The receiver unit is coupled to the antenna unit and is configured to amplify the respective RF signals and output a selected one of the respective amplified RF signals in response to a DC control signal. The down converter is coupled to the receiver unit via a transmission line and is configured to further amplify, down convert and output the selected amplified RF signal as an intermediate signal. The DC power/control supply is coupled to the receiver unit via the same transmission and is configured to produce a power/control signal that is transmitted over the same transmission line in which the selected amplified RF signal is transmitted, thereby providing power and control to the receiver unit.

17 Claims, 4 Drawing Sheets

ANTENNA RECEIVING SYSTEM

CROSS REFERENCE TO RELATED APPLICATIONS

The present application is a continuation of U.S. patent application Ser. No. 09/167,311, filed on Oct. 6, 1998, now U.S. Pat. No. 6,556,807, the contents of which are fully incorporated herein by reference.

FIELD OF THE INVENTION

The present invention pertains to the field satellite antennas, including receiving systems for satellite antennas.

BACKGROUND OF THE INVENTION

Geosynchronous communications satellites transmit radio signals from a synchronous earth orbit, approximately 22,000 miles above the equator, to an antenna that receives signals on earth. Such antennas may include direct to the home ("DTH") antennas or Very Small Aperture Terminals ("VSAT"). A DTH antenna is installed at a home and is used to receive analog and digital television signals from a geosynchronous communications satellite. A VSAT is installed at a business or a home and is used to transmit and receive data and voice signals to and from a geosynchronous satellite.

Many receiving antennas are configured to receive two differently polarized signals (e.g., horizontal/vertical linear polarization or left-hand/right-hand circular polarization) transmitted over the same frequency band, thereby effectively doubling the capacity of the available radio spectrum. For example, referring to FIG. 1, a prior art antenna system 10 includes a parabolic reflector 12 and a Neutonian feed horn 14 located at the focus of the reflector 12. The feed horn 14 is configured to receive first and second polarized signals 13 and 15 transmitted by a communications satellite (not shown).

The feed horn 14 includes an orthomode transducer (not shown) configured to isolate the respective polarized signals 13 and 15. The antenna system 10 further includes a switch 16 for selecting one of the respective polarized signals 13 and 15. In particular, the switch 16 has first and second inputs 18 and 20 coupled to the feed horn orthomode transducer via respective transmission lines 22 and 24, with the first polarized signal 13 being conveyed to the switch input 18 and the second polarized signal 15 conveyed to the switch input 20. A switch control 26 is activated to convey one of the respective polarized signals 13 and 15 to a switch output 28, as a selected polarized signal 17. A low noise block down converter ("LNB") 30 having an input 32 coupled to the switch output 28 via a coaxial cable 32 receives the selected polarized signal 17. The LNB 30 amplifies and down converts the selected polarized signal 17 to an intermediate signal 19 that can be demodulated at an output 34 of the LNB 30 by a device, such as, e.g., a modem or digital television.

In order for the antenna system 10 to operate, the signal-to-noise ratio of the intermediate signal 19 appearing at the LNB output 34 must be high enough to allow the intermediate signal 19 to be used. The use of transmission lines between the feed horn 14 and the switch 16, however, introduce significant losses into the selected polarized signal 17, thereby decreasing the signal-to-noise ratio of the resulting intermediate signal 19. This problem is compounded in noise cancellation antenna systems that employ duplicative components to receive parallel signals, such as those described in Lusignan, U.S. Pat. No. 5,745,084 and copending application Ser. No. 08/259,980 filed Jun. 17, 1994, both of which are fully incorporated herein by reference.

SUMMARY OF THE INVENTION

The present invention is directed to a receiver unit for use in an antenna system that receives and amplifies respective first and second polarized RF signals to produce respective first and second amplified RF signals, one of which is then selected as a selected amplified RF signal in response to a control signal. In accordance with a further aspect of the invention, a single transmission line is used to convey both the selected amplified RF signal and the control signal to the receiver unit.

In a preferred embodiment, an antenna system includes an antenna unit, a receiver unit, a down converter and a supply. The antenna unit includes a parabolic reflector, a feed horn and an orthomode transducer, which are configured to capture, isolate and transmit respective first and second polarized RF signals to the receiver unit. The receiver unit is coupled to the antenna unit to receive the first and second polarized RF signals. In particular, the receiver unit includes first and second low-noise amplifiers, which amplify the respective first and second polarized RF signals. The receiver unit further comprises a signal selector, which selects one of the respective amplified RF signals in response to a control signal.

The receiver unit is powered by a DC power signal, which is preferably the same as the control signal provided in the form of a DC power/control signal from the supply. The down converter and supply are coupled to the receiver unit via a single transmission line. The selected amplified RF signal is transmitted to the down converter via the transmission line. The down converter down converts the selected amplified RF signal to an intermediate signal. The supply produces the power/control signal, which is transmitted to the receiver unit via the transmission line to provide power and control thereto.

In another preferred embodiment, an antenna system includes a plurality of antenna units and corresponding receiver units, a combiner, a down converter and a supply. Each of the respective antenna units includes a parabolic reflector, a feed horn, a subreflector and an orthomode transducer, which are configured to capture, isolate and transmit respective first and second polarized RF signals to the corresponding receiver unit. Each receiver unit includes first and second low noise amplifiers, which amplify the respective first and second RF signals, and a signal selector, which selects one of the respective amplified RF signals in response to a respective control signal. The receiver units are powered by a DC power signal, which is preferably the same as the control signal provided in the form of a DC power/control signal from the supply.

The combiner is coupled to the receiver units via respective transmission lines, whereby the selected amplified RF signals are transmitted to the combiner. In particular, the combiner combines the selected amplified RF signals and outputs combined amplified RF signal. The down converter and supply are coupled to the combiner via a single transmission line, whereby the combined amplified RF signal is transmitted to the down converter. The down converter down converts the combined amplified RF signal to an intermediate signal. The supply produces the power/control signal, which is transmitted to the respective receiver units via the transmission line and the respective transmission lines to provide power and control thereto.

Other and further objects, features, aspects, and advantages of the present invention will become better understood with the following detailed description of the accompanying drawings.

BRIEF DESCRIPTION OF DRAWINGS

The drawings illustrate both the design and utility of preferred embodiments of the present invention, in which.

DETAILED DESCRIPTION OF DRAWINGS

Figure 1:
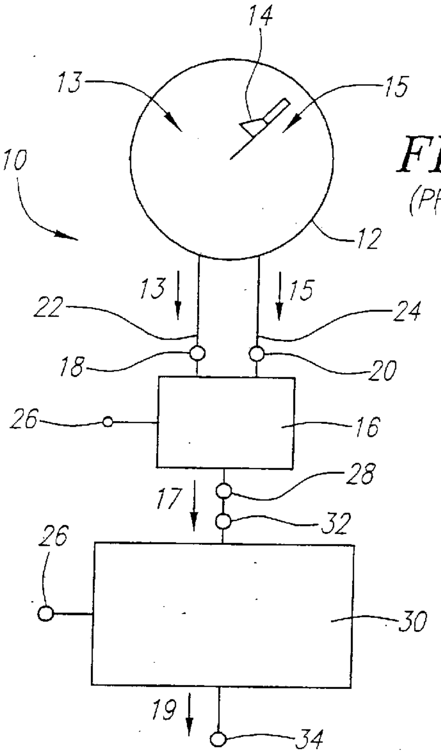
FIG. 1 (PRIOR ART)
FIG. 1 is a block diagram of a prior art receiving antenna system configured to receive and process respective first and second polarized RF signals transmitted from a communications satellite.
Figure 2:
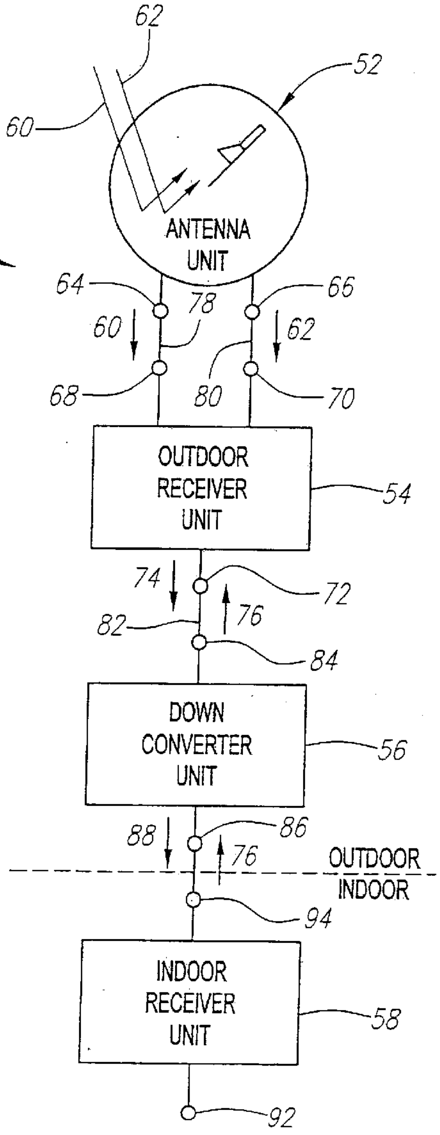
FIG. 2 is a block diagram showing the general aspects of a receiving antenna system constructed in accordance with the present invention, wherein the receiving antenna system is configured to receive and process respective first and second polarized RF signals transmitted from a communications satellite.

Referring to FIG. 2, an antenna system 50 designed in accordance with a preferred embodiment of the present invention is described. The antenna system 50 generally includes an antenna unit 52, an outdoor receiver unit 54, a down converter unit 56 and an indoor receiver unit 58 to receive and process respective first and second RF signals 60 and 62, such as, e.g., horizontally/vertically linear polarized signals or left-hand/right-hand circularly polarized signals.

The antenna unit 52 is configured for capturing, isolating and outputting the respective RF signals 60 and 62 at respective outputs 64 and 66. The outdoor receiver unit 54 is RF coupled to the antenna unit 52 via respective transmission lines 78 and 80 and is configured for receiving the respective RF signals 60 and 62 at respective inputs 68 and 70, amplifying the respective RF signals 60 and 62 and outputting one of the respective amplified RF signals at a port 72. Selection of the respective amplified RF signals is effected in response to a control signal 76 input from the port 72. The control signal 76 is preferably a DC power/control signal 76, which also provides DC power to the outdoor receiver unit 54.

The down converter unit 56 is RF coupled to the outdoor receiver unit 54 via a transmission line 82 and is configured for receiving the selected amplified RF signal 74 at a port 84, further amplifying, down converting and outputting the selected amplified RF signal 74 at a port 86 as an intermediate signal 88. The down converter unit 56 is powered by the DC power/control signal 76 input from the port 84.

The indoor receiver unit 58 is RF coupled to the down converter unit 56 via a transmission line 90 and is configured to farther amplify and demodulate the intermediate signal 88. The outdoor receiver unit 58 is also DC coupled to the down converter unit 56 and receiver unit 54 and is configured for receiving AC power at an AC input 92 from an AC main line (not shown) and producing the DC power/control signal 76 at a port 94. As discussed above, the DC power/control signal 76 is used to effect selection of the respective amplified RF signals in the outdoor receiver unit 54, as well as to provide power to the outdoor receiver unit 54 and down converter unit 56.

The transmission lines 82 and 90 comprise high bandwidth paths through which RF signals pass, and low bandwidth paths through which DC signals pass, such as those existing in coaxial cable. In this manner, both RF signals and DC signals can pass freely between the respective receiver unit 54, down converter unit 56 and indoor receiver unit 58. This obviates the need to provide a separate RF transmission line and separate power/control line. The respective transmission lines 78 and 80 are preferably respective short conductors to reduce the noise added to the respective RF signals 60 and 62 during transmission between the antenna unit 52 and the outdoor receiver unit 54. Any transmission lines, such as, e.g., coaxial cable, however, can be employed to transmit the respective RF signals 60 and 62 without straying from the principles taught by this invention.

Figure 3:
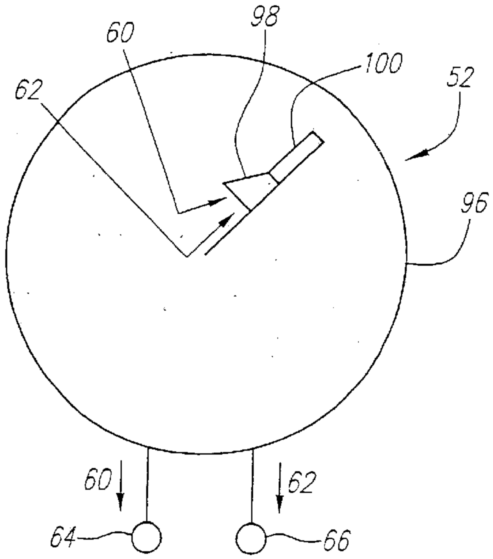
FIG. 3 is a block diagram showing the particular aspects of an antenna unit employed in the receiving antenna system shown in FIG. 2.

Referring to FIG. 3, the antenna unit 52 particularly includes a parabolic reflector 96, which reflects and directs the respective RF signals 60 and 62 towards a focus. The antenna unit 52 further includes a Neutonian feed horn 98 disposed at the focus of the parabolic reflector 96 to capture the respective RF signals 60 and 62. The antenna unit 52 further includes an orthomode transducer 100 disposed at the base of the feed horn 98 to isolate and transmit the respective RF signals 60 and 62 to respective outputs 64 and 66. It should be noted that an orthomode transducer includes any structure capable of isolating polarized signals, such as, e.g., a first probe arranged to propagate a horizontally polarized signal and a second probe arranged to propagate a vertically polarized signal.

Figure 4:
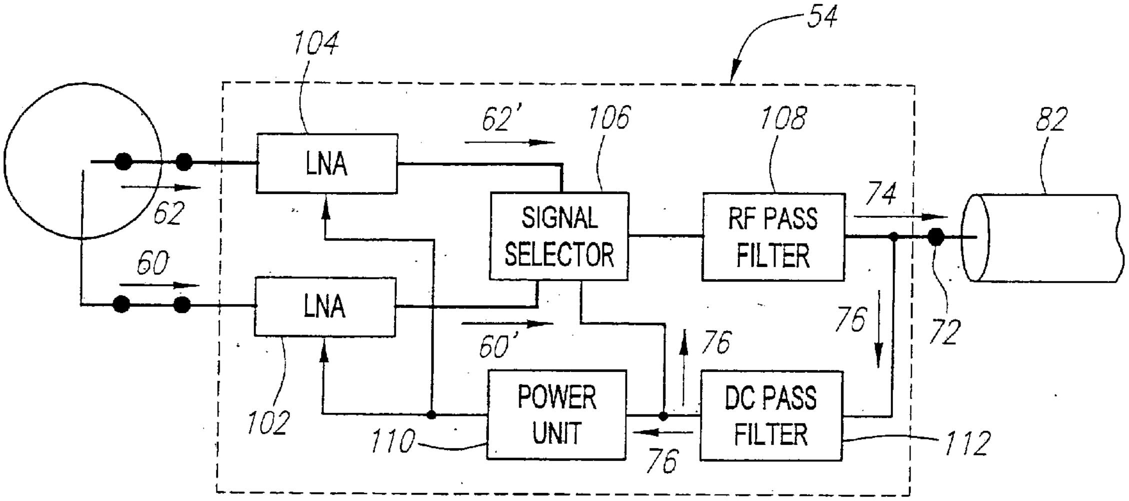
FIG. 4 is a block diagram showing the particular aspects of an outdoor receiver unit employed in the receiving antenna system shown in FIG. 2.

Referring to FIG. 4, the outdoor receiver unit 54 particularly includes a first low noise amplifier (LNA) 102 and a second low noise amplifier (LNA) 104, which are respectively configured for pre-amplifying the respective RF signals 60 and 62 respectively received from the signal selector inputs 68 and 70 and producing respective pre-amplified RF signals 60' and 62'. In this manner, the respective RF signals 60 and 62 are amplified prior to the transmission thereof through the remaining circuit, thereby improving the signal-to-noise ratio of the antenna system 50.

The outdoor receiver unit 54 further includes a signal selector 106 RF coupled to the respective LNA's 102 and 104 and configured for selecting one of the respective pre-amplified polarized signals 60' and 62'. Electronic manipulation of the receiver port 72 activates the signal selector 106 to transmit one of the respective pre-amplified polarized signals 60' and 62' through the signal selector 106 to the receiver port 72 as the selected amplified signal 74. The signal selector 106 is connected to the high bandwidth path of the transmission line 82 at the port 72 through an RF pass filter 108, which accordingly blocks DC signals from entering the RF circuitry of the outdoor receiving unit 54. The outdoor receiver unit 54 further includes a power unit 110 DC coupled to the respective LNA's 102 and 104 and configured for providing and regulating DC power thereto. The power unit 110 is connected to the low bandwidth path of the transmission line 82 at the port 72 through a DC pass filter 112, which accordingly blocks RF signals from entering the DC circuitry of the outdoor receiver unit 54.

Figure 5:
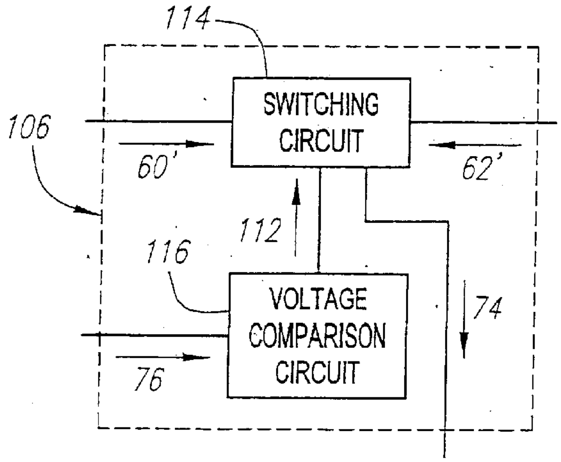
FIG. 5 is a block diagram showing the particular aspects of a signal selector employed in the receiver unit shown in FIG. 4.

Referring to FIG. 5, the signal selector 106 particularly includes an electronic switching circuit 114 and a voltage comparison circuit 116, which is RF coupled to and configured to manipulate the electronic switch circuit 114 to select one of the respective pre-amplified RF signals 60' and 62'. The voltage comparison circuit 116 controls the switching circuit 114 with a polarization selection signal 112. The selection signal 112 is based on the DC power/control signal 76, which discretely varies as discussed further below. In particular, the voltage comparison circuit 116 compares the DC power/control signal 76 to a single threshold. If the magnitude of the DC power/control signal 76 is less than the threshold, the first pre-amplified RF signal 60' is selected. If the magnitude of the DC power/control signal 76 is greater than the threshold, the second pre-amplified RF signal 76 is selected. Alternatively, the magnitude of the DC power/control signal 76 can be compared to respective first and second thresholds. If the magnitude of the DC power/control signal 76 is between the respective first and second thresholds, the first pre-amplified RF signal 60' is selected. If the magnitude of the DC power/control signal 76 is above the second threshold, the second pre-amplified polarized signal 62' is selected. By utilizing multiple thresholds, the outdoor receiver unit 54 can receive signals having more than two polarizations, such as, e.g., signals differentiated by four polarizations, i.e., vertically linear, horizontally linear, left hand circular and right hand circular polarizations, thereby increasing the flexibility of use and portability of the antenna system 50.

In this manner, pre-amplification of the respective RF signals 60 and 62 prior to transmission through the remaining circuitry, improves the signal-to-noise ratio of the antenna system 50. The pre-amplification of the respective RF signals 60 and 62 prior to transmission through the signal selector 106 further improves the signal-to-noise ratio. To compensate for the additional LNA required for pre-amplification of the respective RF signals 60 and 62 prior to selection thereof, the respective LNA's 102 and 104 comprise simple single stage low cost units. Any devices suitable for use as RF amplifiers, however, can be used as the respective LNA's without straying from the principles taught by this invention.

Figure 6:
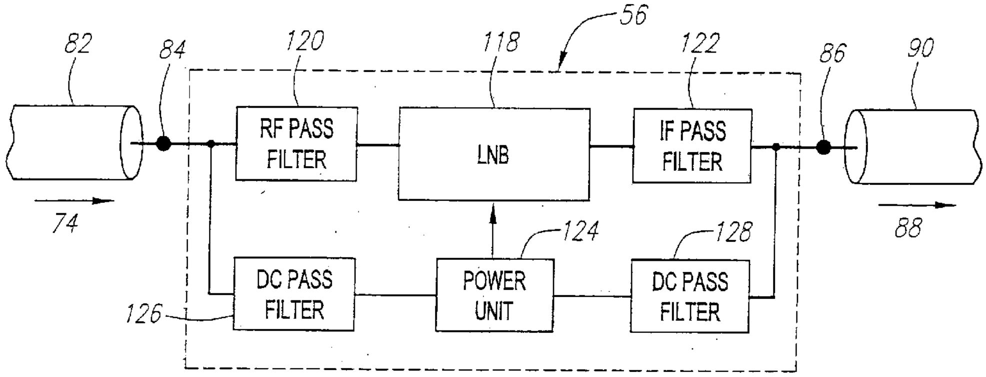
FIG. 6 is a block diagram showing the particular aspects of a down converter unit employed in the receiving antenna system shown in FIG. 2.

Referring to FIG. 6, the down converter unit 56 particularly includes a low noise block down converter (LNB) 118. The LNB 118 is connected to the high bandwidth path of the transmission line 82 at the port 84 through an RF pass filter 120, which accordingly blocks DC signals from entering the RF circuitry of the LNB 118 and IF signals from entering the transmission line 82. The LNB 118 is connected to the high bandwidth path of the transmission line 90 at the port 86 through an IF pass filter 122, which accordingly blocks DC signals from entering the IF circuitry of the LNB 118 and RF signals from entering the transmission line 90. The down converter unit 56 further includes a power unit 124 DC coupled to the LNB 118 and configured for providing and regulating DC power thereto. The power unit 124 is connected to the low bandwidth path of the transmission line 82 at the port 84 through a DC pass filter 126, which accordingly blocks RF signals from entering the power unit 124. The power unit 124 is also connected to the low bandwidth path of the transmission line 90 at the port 86 through a DC pass filter 128, which accordingly blocks IF signals from entering the power unit 124.

Figure 7:
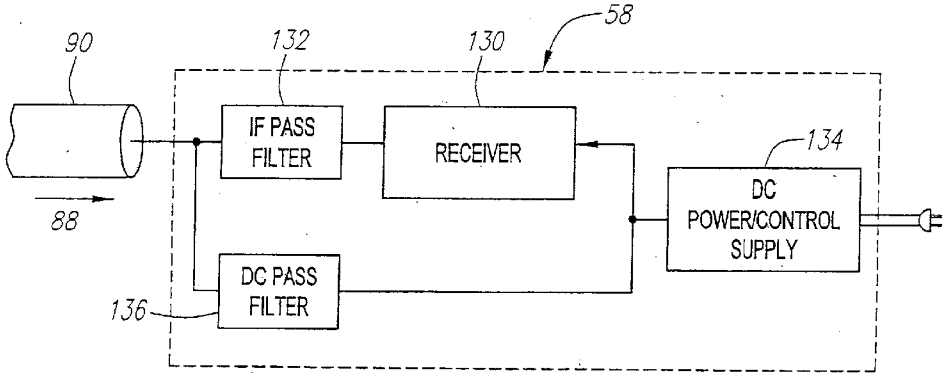
FIG. 7 is a block diagram showing the particular aspects of an indoor receiving unit employed in the receiving antenna system shown in FIG. 2.

Referring to FIG. 7, the indoor receiver unit 58 particularly includes a receiver 130 configured for demodulating and processing the intermediate signal 88. The receiver 130 is connected to the high bandwidth path of the transmission line 90 at the AC input 92 through an IF pass filter 127, which accordingly blocks DC signals from entering the IF circuitry of the receiver 130.

The indoor receiver unit 58 further includes a supply 134, and in particular a DC power/control supply, which is configured for discretely varying the magnitude of the DC power/control signal 76 in accordance with a desired polarization reception, while maintaining the DC power/control signal 76 at a level necessary to provide power to the outdoor receiver unit 54, down converter unit 56, and receiver 130. For instance, selection of the first pre-amplified RF signal 60' can be designated by a DC power/control signal 76 magnitude of 10 volts, whereas selection of the second pre-amplified RF signal 62' can be designated by a DC power/control signal 76 magnitude of 12 volts. It should be noted, however, that rather than employing a single power/control signal 76 to provide power and control to the antenna system 50, distinct power and control signals can be employed to respectively provide power and control to the antenna system 50 without straying from the principles taught by this invention.

In operation, the indoor receiver unit 58 is operated to provide the DC power/control signal 76 corresponding to the desired selected amplified RF signal 74. The DC power/control signal 76 travels from the indoor receiver unit port 94 to the down converter unit port 86, where it is used to power the down converter unit 56 through the power unit 124. The DC power/control signal 74 then passes to the down converter unit port 84 and travels through the transmission line 82 to the receiver unit port 72, where it is used to power the outdoor receiver unit 54 through the power unit 110. The DC power/control signal 74, is also input to the voltage comparison circuit 116, where the magnitude is compared to the threshold signal. The voltage comparison circuit 116 produces the polarization selection signal 112 in response to the comparison. In response to the polarization selection signal 112, the switching circuit 114 is configured to pass the selected amplified RF signal 74 through the signal selector 106.

When the antenna system is powered and properly configured, the reflector 96 captures the respective RF signals 60 and 62, where they are reflected towards and received by the feed horn 98. The orthomode transducer 100 then isolates and transmits the respective RF signals 60 and 62 to the respective antenna unit outputs 64 and 66. The respective RF signals 60 and 62 travel to the respective receiver unit inputs 68 and 70. The respective LNA's 102 and 104 pre-amplify the respective RF signals 60 and 62 to produce respective pre-amplified RF signals 60' and 62'. One of the pre-amplified RF signals 60' and 62' are then transmitted through the properly configured switching circuit 106, through the voltage comparison circuit 116 and to the receiver unit port 72 as the selected amplified RF signal 74. The selected amplified RF signal 74 is then transmitted through the transmission line 82 to the down converter unit port 84, where it is amplified and down converted at the down converter unit port 86 as the intermediate signal 88. The intermediate signal 88 is then transmitted through the transmission line 90 to the indoor receiver unit 58 for further amplification and processing.

Figures 8, 9:
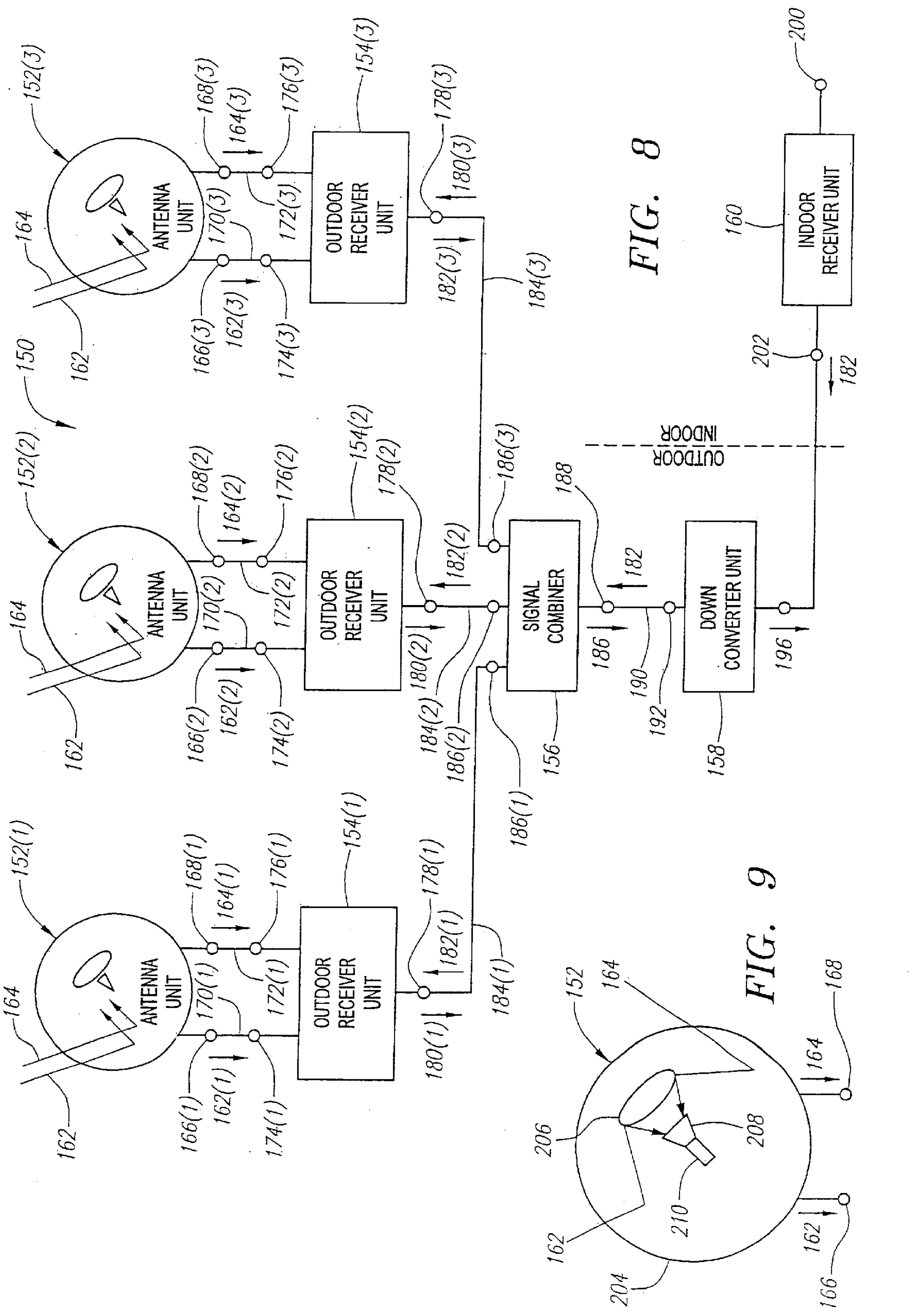
FIG. 8 is a block diagram showing the general aspects of another receiving antenna system constructed in accordance with the present invention, wherein the receiving antenna system is configured to receive and process respective first and second polarized RF signals transmitted from a main communications satellite while minimizing interference from adjacent satellites.
FIG. 9 is a block diagram showing the particular aspects of an antenna unit employed in the receiving antenna system shown in FIG. 8.

Referring to FIG. 8, an antenna system 150 designed in accordance with another preferred embodiment of the present invention is described. The antenna system 150 generally includes respective first, second and third antenna units 152(1), 152(2), and 152(3); respective first, second and third outdoor receiver units 154(1), 154(2) and 154(3); a signal combiner 156; a down converter unit 158; and an indoor receiver unit 160. The antenna system 150 is configured to receive and process respective first and second RF signals 162 and 164, such as, e.g., horizontally/vertically linear polarized signals or left-hand/right-hand circularly polarized signals, while minimizing interference from communications satellites adjacent the main communications satellite.

The respective antenna units 152(1), 152(2) and 152(3) are configured for capturing, isolating, splitting, and outputting the respective RF signals 162 and 164 at respective outputs 166(1) and 168(1) as first respective RF signals 162(1) and 164(1), at respective outputs 166(2) and 168(2) as second respective RF signals 162(2) and 164(2), and at respective outputs 166(3) and 168(3) as third respective RF signals 162(3) and 164(3).

The respective outdoor receiver units 154(1), 154(2) and 154(3) are RF coupled to the respective antenna units 152(1), 152(2) and 152(3) via respective short conductors 170(1) and 172(1), 170(2) and 172(2), and 170(3) and 172(3). The respective outdoor receiver units 154(1), 154(2) and 154(3) are configured for receiving the respective RF signals 162(1) and 164(1) at respective inputs 174(1) and 176(2), respective RF signals 162(2) and 164(2) at respective inputs 174(2) and 176(2), and respective RF signals 162(3) and 164(3) at respective inputs 174(3) and 176(3). The respective outdoor receiver units 154(1), 154(2) and 154(3) are also configured for amplifying the respective RF signals 162(1) and 164(1), 162(2) and 164(2), and 162(3) and 164(3), and outputting either the amplified respective RF signals 162(1), 162(2) and 162(3) or the amplified respective RF signals 164(1), 164(2) and 164(3) at respective ports 178(1), 178(2) and 178(3) as respective first, second and third selected amplified RF signals 180(1), 180(2) and 180(3) in response to respective first, second and third DC power/control signals 182(1), 182(2) and 182(3) on the respective ports 178(1), 178(2) and 178(3).

The respective outdoor receiver units 154(1), 154(2) and 154(3) are powered by the respective DC power/control signals 182(1), 182(2) and 182(3) input from the respective ports 178(1), 178(2) and 178(3). The particular aspects of each of the respective outdoor receiver units 154(1), 154(2) and 154(3) are similar to those of the outdoor receiver unit 54 described with respect to FIGS. 4 and 5 in that each receiver unit 154 includes two respective LNA's to amplify the respective RF signals 162 and 164 and a signal selector to select one of the respective RF signals 162 and 164.

The signal combiner 156 is RF coupled to the respective outdoor receiver units 154(1), 154(2) and 154(3) via respective transmission lines 184(1), 184(2) and 184(3), such as, e.g., coaxial cable. The signal combiner 156 is configured for receiving and combining the respective selected amplified RF signals 180(1), 180(2) and 180(3) at respective ports 186(1), 186(2) and 186(3) as a combined and selected amplified RF signal 186 at a port 188. The respective transmission lines 184(1), 184(2) and 184(3) are preferably of equal length to maintain equal phases between the respective selected amplified RF signals 180(1), 180(2) and 180(3). The signal combiner 156 is also configured for combining the respective selected amplified RF signals 180(1), 180(2) and 180(3), preferably with equal amplitude, and outputting a combined and selected amplified RF signal 186 at the port 188. The techniques of combining multiple signals are disclosed in further detail in Lusignan, U.S. Pat. No. 5,745,084 and copending application Ser. No. 08/259,980 filed Jun. 17, 1994, which have been fully incorporated herein by reference.

The down converter unit 158 is RF coupled to the signal combiner 156 via a transmission line 190, such as, e.g., a short conductor, and is configured for receiving the combined and selected amplified RF signal 186 at the port 192, further amplifying, down converting and outputting the combined and selected amplified RF signal 186 at a port 194 as an intermediate signal 196. The down converter unit 158 is powered by the DC power/control signal 182 input from the port 194. The particular aspects of the down converter unit 158 are similar to those of the down converter unit 56 described with respect to FIG. 6.

The indoor receiver unit 160 is RF coupled to the down converter unit 158 via a transmission line 198 and is configured to further amplify and demodulate the intermediate signal 196. The outdoor receiver unit 160 is also DC coupled to the down converter unit 158 and respective outdoor receiver units 154(1), 154(2) and 154(3) and is configured for receiving AC power at an AC input 200 from an AC main line (not shown) and producing the DC power/control signal 182 at a port 202. As discussed above, the DC power/control signal 182 is used to effect selection of the respective amplified RF signals in the respective outdoor receiver unit 54, as well as to provide power to the respective outdoor receiver units 160 and down converter unit 158. The particular aspects of the indoor receiver unit 158 are similar to those of the receiver unit 58 described with respect to FIG. 7.

The respective transmission lines 184(1), 184(2), 184(3) and 198 comprise high bandwidth paths through which RF signals pass, and low bandwidth paths through which DC signals pass, such as those existing in coaxial cable. The respective transmission lines 170(1), 170(2), 170(3), 172(1), 172(2), 172(3) and 190 are preferably respective short conductors to reduce the noise added to the respective RF signals 162(1) and 164(1), 162(2) and 164(2) and 162(3) and 164(3) during transmission between the respective antenna units 152(1), 152(2) and 152(3) and the respective outdoor receiver units 154(1), 154(2) and 154(3), and to reduce the noise added to the combined and selected amplified RF signal 186 during transmission between the signal combiner 156 and down converter unit 158.

Referring to FIG. 9, each antenna unit 152 particularly includes a parabolic reflector 204, a subreflector 206, a feed horn 208 and an orthomode transducer 210. The reflector 204 of each antenna unit 152 is shaped and spaced from the other reflectors 204, such that the main communications satellite is disposed at the center of the main beam of the antenna pattern produced by the antenna system 150 and the communications satellites adjacent the main communications satellite are disposed at the nulls of the antenna pattern, the technique of which is described in Lusignan, U.S. Pat. No. 5,745,084 and copending application Ser. No. 08/259,980 filed Jun. 17, 1994, which have been fully incorporated herein by reference.

In operation, the indoor receiver unit 160 is operated to provide the DC power/control signal 182 corresponding to the respective selected amplified RF signals 180(1), 180(2) and 180(3). The DC power/control signal 182 travels from the indoor receiver unit port 202 to the down converter port 194, where it is used to power the down converter 158. The DC power/control signal 182 then passes to the down converter port 192 and travels through the transmission line 190 to the combiner port 188, where it passes through the signal combiner 156 to the respective combiner ports 186 (1), 186(2) and 186(3) as respective DC power/control signals 182(1), 182(2) and 182(3).

The respective DC power/control signals 182(1), 182(2) and 182(3) then travel through the respective transmission lines 184(1), 184(2) and 184(3) to the respective receiver unit ports 178(1), 178(2) and 178(3), where they are used to power the respective outdoor receiver units 154(1), 154(2) and 154(3). The respective DC power/control signals 182 (1), 182(2) and 182(3) are also used to configure the respective outdoor receiver units 154(1), 154(2) and 154(3) to pass the respective selected amplified RF signals 180(1), 180(2) and 180(3).

While the antenna system 150 is powered and properly configured, the respective reflectors 152(1), 152(2) and 152(3) capture the respective RF signals 162 and 164, where they are reflected towards the respective subreflectors 206 (1), 206(2) and 206(3) and reflected again into the respective feed horns 208(1), 208(2) and 208(3) as respective RF signals 162(1) and 164(1), 162(2) and 164(2), and 162(3) and 164(3). The respective orthomode transducers then respectively isolate the RF signals 162(1), 162(2) and 162(3) from the RF signals 164(1), 164(2) and 164(3). The respective RF signals 162(1) and 164(1), 162(2) and 164(2) and 162(3) and 164(3) are output on the respective antenna outputs 166(1) and 168(1), 166(2) and 168(2), and 166(3) and 168(3), which then travel to the respective receiver unit inputs 174(1) and 176(1), 174(2) and 176(2) and 174(3) and 176(3). The respective outdoor receiver units 154(1), 154(2) and 154(3) amplify the respective RF signals 162(1) and 164(1), 162(2) and 164(2), and 166(3) and 166(3) and pass the respective selected amplified RF signals 180(1), 180(2) and 180(3) to the respective receiver unit ports 178(1), 178(2) and 178(3). The respective selected amplified RF signals 180(1), 180(2) and 180(3) are then transmitted through the respective transmission lines 184(1), 184(2) and 184(3) to the respective combiner ports 186(1), 186(2) and 186(3), where they are combined and passed to the combiner port 188 as the combined and selected amplified RF signal 186. The combined and selected amplified RF signal 186 is then transmitted through the transmission line 190 to the down converter port 192, where it is amplified and down converted at the down converter port 194 as the intermediate signal 196 for passage through the transmission line 198.

While the embodiments, applications and advantages of the present invention have been depicted and described, there are many more embodiments, applications and advantages possible without deviating from the spirit of the inventive concepts described herein. Thus, the inventions are not to be restricted to the preferred embodiments, specification or drawings. The protection to be afforded this patent should therefore only be restricted in accordance with the spirit and intended scope of the following claims.

What is claimed is:

1. An antenna system, comprising:

a plurality of antenna units;

a plurality of receiver units respectively coupled to the antenna units, each receiver comprising a plurality of amplifiers and a signal selector coupled to the plurality of amplifiers;

a signal combiner coupled to each of the receiver units;

a low noise block down converter coupled to the signal combiner;

an intermediate signal receiver coupled to the converter; and a DC supply coupled to the intermediate signal receiver and the converter, combiner, and plurality of receiver units via respective transmission lines.

2. The antenna system of claim 1, wherein the DC supply provides either DC power or the control signal to the respective receiver units.

3. The antenna system of claim 1, wherein the DC supply provides both DC power and the control signal to the respective receiver units.

4. The antenna system of claim 1, wherein the respective transmission lines each comprise coaxial cable and the DC supply is coupled to a center conductor of the respective coaxial cables.

5. The antenna system of claim 1, wherein the signal selector comprises a switching circuit coupled to a voltage comparison circuit.

6. The antenna system of claim 1, wherein each antenna unit is configured for capturing, isolating and outputting a plurality of signals.

7. The antenna system of claim 6, wherein the plurality of amplifiers of each receiver each receiver is configured for receiving and amplifying the plurality of signals outputted by the respective antenna unit.

8. The antenna system of claim 7, wherein the signal selector is configured for selecting one of the amplified signals in response to a control signal.

9. The antenna system of claim 8, wherein the combiner is configured for combining the respective selected amplified signals.

10. The antenna system of claim 9, wherein the converter is configured for receiving, amplifying, and down converting the combined selected amplified signals from the signal combiner.

11. An antenna system, comprising:

a plurality of antenna units, each antenna unit configured for capturing, isolating and outputting first and second signals;

a corresponding plurality of receiver units respectively coupled to the antenna units, each receiver unit comprising a first amplifier configured for receiving and amplifying the first signal outputted by the respective antenna unit, a second amplifier configured for receiving and amplifying the second signal outputted by the respective antenna unit, and a signal selector coupled to the first and second amplifiers and configured for selecting between first amplified signal and the second amplified signal in response to a control signal;

a signal combiner coupled to each of the receiver units and configured for combining the respective selected amplified signals, and a low noise block down converter coupled to the signal combiner and configured for receiving, amplifying, and down converting the combined selected amplified signals from the signal combiner.

12. The antenna system of claim 11, wherein a DC supply provides either DC power or the control signal to the respective receiver units.

13. The antenna system of claim 11, wherein a DC supply provides both DC power and the control signal to the respective receiver units.

14. The antenna system of claim 11, further comprising respective transmission lines interconnecting the converter to the combiner and the combiner to each of the plurality of receiver units, wherein each transmission line comprises a coaxial cable and wherein a DC supply is coupled to a center conductor of the respective coaxial cables.

15. The antenna system of claim 11, wherein each signal selector includes a common port for outputting the selected amplified signal and for receiving the control signal.

16. The antenna system of claim 11, wherein the control signal provides operating power for each of the respective signal selectors, and respective first and second amplifiers.

17. The antenna system of claim 11, wherein each of the signal selectors comprises an electronic switching circuit and a voltage comparison circuit, the voltage comparison circuit configured for comparing the control signal to a threshold signal and producing a selection signal in response thereto, the electronic switching circuit outputting the selected amplified signal in response to the selection signal.

* * * * *